United States Patent
Grob et al.

(10) Patent No.: US 6,564,135 B2
(45) Date of Patent: May 13, 2003

(54) BRAKING TORQUE REGULATOR FOR A VEHICLE, METHOD FOR REGULATING A BRAKING TORQUE AND CIRCUIT FOR A BRAKING TORQUE REGULATOR

(75) Inventors: Ferdinand Grob, Besigheim (DE); Dietmar Arndt, Kleinsachsenheim (DE); Rolf Maier-Landgrebe, Kernen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/053,447

(22) Filed: Jan. 17, 2002

(65) Prior Publication Data

US 2002/0143456 A1 Oct. 3, 2002

(30) Foreign Application Priority Data

Jan. 17, 2001 (DE) .......................................... 101 01 830

(51) Int. Cl.$^7$ ................................................. G06G 7/76
(52) U.S. Cl. ............................ 701/70; 701/82; 701/83; 701/84; 701/78; 180/197
(58) Field of Search .............................. 701/70, 71, 82, 701/83, 84, 85, 86, 90, 78; 180/197

(56) References Cited

U.S. PATENT DOCUMENTS 6,182,003 B1 * 1/2001 Maier-Landgrebe ......... 701/84
6,208,926 B1 * 3/2001 Wagner et al. ................ 701/70

* cited by examiner

Primary Examiner—Gertrude Arthur
(74) Attorney, Agent, or Firm—Kenyon & Kenyon

(57) ABSTRACT

A braking torque regulator for a vehicle includes a braking energy recovery arrangement that is able to generate a first braking torque which may not exceed a maximum first braking torque, and a mechanical brake system that is able to generate a second braking torque. The braking torque regulator is supplied with a setpoint braking torque, and the first braking torque and/or the second braking torque is regulated by the braking torque regulator so that the setpoint braking torque is used to correct an actual braking torque detected by a sensor system. A method is for regulating a braking torque in a vehicle and circuitry for a braking torque regulator for a vehicle.

24 Claims, 3 Drawing Sheets

BRAKING TORQUE REGULATOR FOR A VEHICLE, METHOD FOR REGULATING A BRAKING TORQUE AND CIRCUIT FOR A BRAKING TORQUE REGULATOR

FIELD OF THE INVENTION

The present invention relates to a braking torque regulator for a vehicle having a braking energy recovery arrangement that is able to generate a first braking torque that may not exceed a maximum first braking torque, and a mechanical brake system that is able to generate a second braking torque. The present invention also relates to a method for regulating a braking torque in a vehicle of this type. The present invention further relates to circuitry for a braking force regulator in a vehicle that has a braking energy recovery arrangement.

BACKGROUND INFORMATION

In vehicles with a braking energy recovery arrangement, a first braking torque may be generated, for example, by converting kinetic energy to electric energy. This electric energy may then be fed back, for example, to a storage battery. However, there is a maximum first braking torque that cannot be exceeded and depends, for example, on the battery charge state. If the maximum first braking torque that may be generated by the braking energy recovery arrangement is insufficient, a conventional mechanical, i.e., hydraulic, brake system is additionally activated which may generate a second braking torque, the level of which depends, for example, on the force applied to a brake pedal. The disadvantage of this method is that the pedal force needed to generate a total braking torque varies as a function of the instantaneous maximum first braking torque that may be generated by the braking energy recovery arrangement.

SUMMARY

Because, in the braking torque regulator according to the present invention, a setpoint braking torque is supplied to the braking torque regulator, and the first breaking torque and/or second braking torque is regulated by the braking torque regulator so that an actual braking torque measured by a sensor system is used to correct the setpoint braking torque, an actual braking torque dependent on the setpoint braking torque may be generated without the instantaneous maximum first braking torque having an effect that may be felt by the driver.

The sensor system may include, for example, wheel force sensors. The use of wheel force sensors may provide that a feedback signal representing the actual forces acting upon the wheel may be generated.

The sensor system may detect the actual braking torque that is being transmitted to the road by the wheels, since, in this case, all errors occurring in the brake system, for example, are incorporated directly into the regulation result.

The setpoint braking torque may be, for example, dependent on a position of a brake actuating element and/or a force applied thereto. If the brake actuating element is designed as a brake pedal, it is possible to ensure that, regardless of the maximum first braking torque that may currently be generated, the same actual braking torque is always generated with the same pedal position or pedal force. Depending on the vehicle type, the brake actuating element may also be designed, for example, as a hand brake.

According to one example embodiment of the braking torque regulator according to the present invention, only the second braking torque generated by the mechanical brake system is regulated.

In this case, for example, the following relationship may apply to the first braking torque to be generated by the braking energy recovery arrangement:

$$ME = \min\{MS, MEMAX\},$$

and the following relationship may apply to the braking torque to be generated by the mechanical brake system:

$$MM = MS - MI.$$

In this case, ME represents the first braking torque to be generated by the braking energy recovery arrangement, MS represent the setpoint braking torque, MEMAX represents the instantaneous maximum first braking torque, MM represents the second braking torque to be generated by the mechanical brake system and MI represents the actual braking torque detected by the sensor system. In this example embodiment of the braking torque regulator according to the present invention, the braking energy recovery arrangement continues to perform the braking action as long as allowed by the instantaneous value of the maximum first braking torque. If, for some reason, the first braking torque to be generated by the braking energy recovery arrangement fails to act, or only incompletely acts, upon the wheel, this is compensated by the second braking torque generated by the mechanical brake system. The second braking torque is further used to generate actual braking torques that are higher than the instantaneous maximum first braking torque.

According to another example embodiment of the present invention, only the first braking torque generated by the braking energy recovery arrangement is regulated.

In this case, the first braking torque may be divided into a first braking torque component and a second braking torque component, with a selectable reserve torque being provided for setting the range of regulation. In this example embodiment, the following relationships may apply:

$$MVOR \leq MEMAX;$$

$$ME = MEG + MED;$$

$$MEG = \min\{MS, MEMAX - MVOR\};$$

$$MED = MS - MI; \text{ and}$$

$$MM = \max\{MS - MEMAX, 0\}.$$

In this case, MVOR represents the reserve torque, MEMAX represents the current maximum first braking torque, ME represents the first braking torque to be generated by the braking energy recovery arrangement, MEG represents a first braking torque component of the first braking torque, MED represents a second braking torque component of the first braking torque, MS represents the setpoint braking torque, and MI represents the actual braking torque detected by the sensor system. In this example embodiment, the second braking torque component of the first braking torque is used to correct the setpoint braking torque. The mechanical brake system in this case is activated only if the setpoint braking torque is higher than the current maximum first braking torque which may be generated by the braking energy recovery arrangement.

The braking energy recovery arrangement may be provided in the form of an electric machine operated in generator mode. The energy generated by this electric machine may be stored, for example, at least partially in a storage battery for later use.

In addition, the electric machine may also be operated as a motor. In connection with hybrid vehicles, for example, this motor may help drive the vehicle. However, it is also possible to use the motor as a starter.

In certain example embodiments of the braking torque regulator according to the present invention, the setpoint braking torque may be influenced by a higher-level regulating device. A higher-level regulating device of this type may be, for example, an anti-lock system, a traction control system or any system which is suitable for improving driving stability.

Because a method according to the present invention includes the following steps:

a) Detection of a setpoint braking torque;

b) Provision of a sensor system and detection of an actual braking torque by the sensor system; and c) Regulation of the first braking torque and/or the second braking torque so that the actual braking torque is used to correct the setpoint braking torque;

an actual braking torque dependant on the setpoint braking torque may be generated without the current maximum first braking torque having an effect which is noticeable to the driver.

In the method according to the present invention, step b) may include, for example, detecting the wheel forces. This makes it possible, during regulation, to take into account errors in the brake system or deviations in the braking action due to wear and tear.

Step b) may include detecting the torque transmitted from the wheels to the road as the actual braking torque. In addition, this makes it possible, for example, to take into account roadway properties.

Step a) of the method according to the present invention may include, for example, detecting a position of a brake actuating element and/or a force applied thereto. The brake actuating element may be designed as a brake pedal or hand brake, and the ease of vehicle handling may be increased, for example, by always generating the same actual braking torque with a certain pedal force, regardless of the current maximum first braking torque that may be generated by the braking energy recovery arrangement.

In one example embodiment of the method according to the present invention, only the second braking torque is regulated.

In this case, step c) may include, for example, the following substeps:

c1) Determination of the first braking torque according to the following relationship:

$ME = \min\{MS, MEMAX\}$; and c2) Determination of the second braking torque according to the following relationship:

$MM = MS - MI$;

where MS represents the first braking torque, MS represents the setpoint braking torque, MEMAX represents the current maximum first braking torque, MM represents the second braking torque and MI represents the actual braking torque.

According to a second example embodiment of the method according to the present invention, only the first braking torque is regulated.

In this case, step c) may include, for example, the following substeps:

c3) Definition of a reserve torque for setting the range of regulation so that the following relationship applies:

$MVOR \leq MEMAX$;

c4) Determination of a first braking torque component of the first braking torque according to the following relationship:

$MEG = \min\{MS, MEMAX - MVOR\}$;

c5) Determination of a second braking torque component of the first braking torque according to the following relationship:

$MED = MS - MI$;

c6) Determination of the second braking torque according to the following relationship:

$MM = \max\{MS - MEMAX, 0\}$;

where MVOR represents the reserve torque, MEG represents the first braking torque component of the first braking torque, MED represents the second braking torque component of the first braking torque, ME represents the first braking torque, MS represents the setpoint braking torque, MEMAX represents the current maximum first braking torque, MM represents the second braking torque and MI represents the actual braking torque.

In connection with the method according to the present invention, it is also possible for the brake energy recovery arrangement to be designed as an electric machine operated in generator mode, which is able, for example, to supply power to a storage battery.

The electric machine in this case may also be operated as a motor, for example, as a motor for a hybrid vehicle, as a starter, etc.

Method step a) may include, for example, having the setpoint braking torque influenced by a higher-level regulating device in certain vehicle operating states. This higher-level regulating device may also be formed, for example, by an anti-lock system, a traction control system, a regulating system to control vehicle stability, etc.

The present invention also relates to circuitry for a braking force controller of a vehicle which has a braking energy recovery arrangement.

In a first example embodiment of the circuit according to the present invention, the circuit has the following signal inputs and signal outputs:

A first signal input for supplying a first input signal corresponding to a setpoint braking torque;

A second signal input for supplying a second input signal corresponding to a maximum braking torque that may be generated by the braking energy recovery arrangement;

A third signal input for supplying a third input signal corresponding to a detected actual braking torque;

A first signal output for outputting a first output signal which defines a first braking torque to be generated by the braking energy recovery arrangement; and A second signal output for outputting a second output signal which defines a second braking torque to be generated by a mechanical brake system.

In this example embodiment of the circuit according to the present invention, the first output signal is determined so that the following applies to the first braking torque:

$$ME = \min\{MS, MEMAX\}.$$

The second output signal is determined so that the following applies to the second braking torque:

$$MM = MS - MI.$$

In this case, ME represents the first braking torque, MS represents the setpoint braking torque, MEMAX represents the current maximum first braking torque, MM represents the second braking torque and MI represents the actual braking torque.

In a second example embodiment of the circuit according to the present invention, the circuit has the same signal inputs and signal outputs as in the first example embodiment. In the second example embodiment of the circuit according to the present invention, however, a reserve torque is provided for setting the range of regulation. If MVOR represents the reserve torque, MEMAX represents the current maximum first braking torque, ME represents the first braking torque, MEG represents a first braking torque component of the first braking torque, MED represents a second braking torque component of the first braking torque, MS represents a setpoint braking torque, MI represents an actual braking torque and MM represents a second braking torque, and if MVOR is less than or equal to MEMAX, the second example embodiment of the circuit according to the present invention supplies the following output signals:

The first output signal is determined so that the following applies to a first braking torque composed of the first braking torque component and the second braking torque component:

$$ME = MEG + MED, \text{ where}$$

$$MEG = \min\{MS, MEMAX - MVOR\} \text{ and}$$

$$MED = MS - MI.$$

The second output signal is determined so that the following applies to the second braking torque:

$$MM = \max\{MS - MEMAX, 0\}.$$

DETAILED DESCRIPTION

Figure 1:
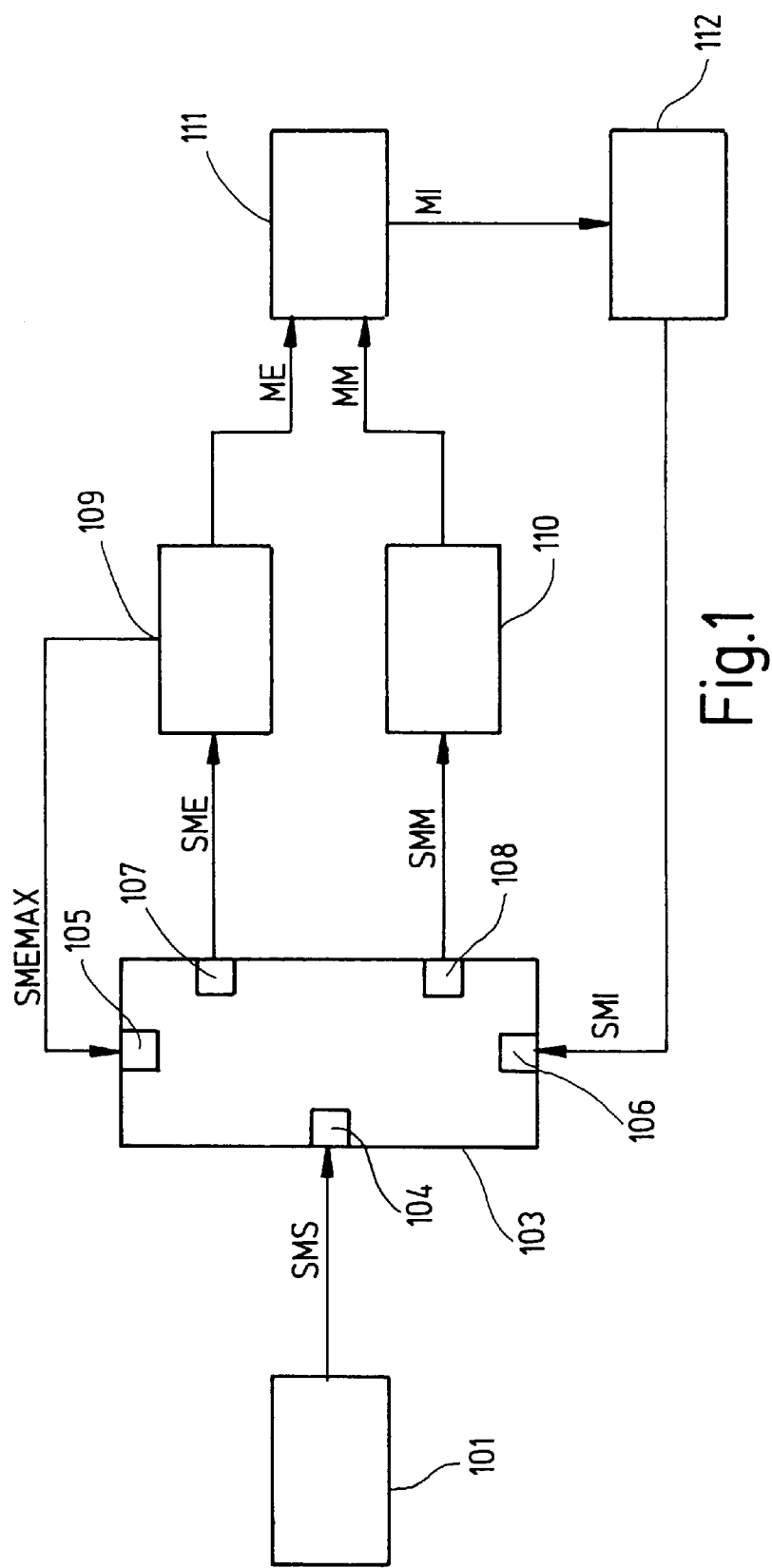
FIG. 1 is a schematic block diagram of a braking torque regulator according to the present invention.

FIG. 1 is a block diagram of an example embodiment of the braking torque regulator according to the present invention. As illustrated in FIG. 1, a circuit block 103, which may be formed by one of the circuits according to the present invention, has a first signal input 104 for supplying a first input signal SMS corresponding to a setpoint braking torque MS. Block 103 also has a second signal input 105 for supplying a second input signal SMEMAX corresponding to a maximum braking torque MEMAX that may be generated by the braking energy recovery arrangement. A third signal input 106 of block 103 is used to supply a third input signal SMI corresponding to a detected actual braking torque MI. Block 103 has a first signal output 107 for outputting a first output signal SME that defines a first braking torque ME to be generated by braking energy recovery arrangement 109. Block 103 has a second signal output 108 for outputting a second output signal SMM that defines a second braking torque MM to be generated by a mechanical brake system 110. A block 109 supplies signal SMEMAX that represents current maximum first braking torque MEMAX. The level of this maximum first braking torque MEMAX may be dependent, for example, on the charge state of a storage battery that is supplied with power by a generator belonging to braking energy recovery arrangement 109. A block 101 supplies block 103 with signal SMS, which represents setpoint braking torque MS. Setpoint braking torque MS may be detected, for example, by a pedal position or a pedal force, with higher-level regulating devices also being able to influence setpoint braking torque MS. First signal output 107 of block 103 is connected to a block 109, which forms the braking energy recovery arrangement. Block 109 supplies signal SMEMAX to second signal input 105 of block 103. Via first signal output 107, block 109 is supplied with signal SME, which determines which first braking torque ME is to be generated by braking energy recovery arrangement 109. Second signal output 108 of block 103 is connected to a block 110 which forms the mechanical brake system. Via second signal output 108, mechanical brake system 110 is supplied with a signal SMM, which determines which second braking torque is to be generated by mechanical brake system 110. First braking torque ME generated by braking energy recovery arrangement 109 as well as second braking torque MM generated by mechanical brake system 110 act upon one or more wheels, which are represented by a block 111. A sensor system 112 is connected through a suitable arrangement to wheels 111 to detect an actual braking torque MI. A signal SMI representing this actual braking torque MI is supplied by sensor system 112 to third signal input 106 of block 103.

Figure 2:
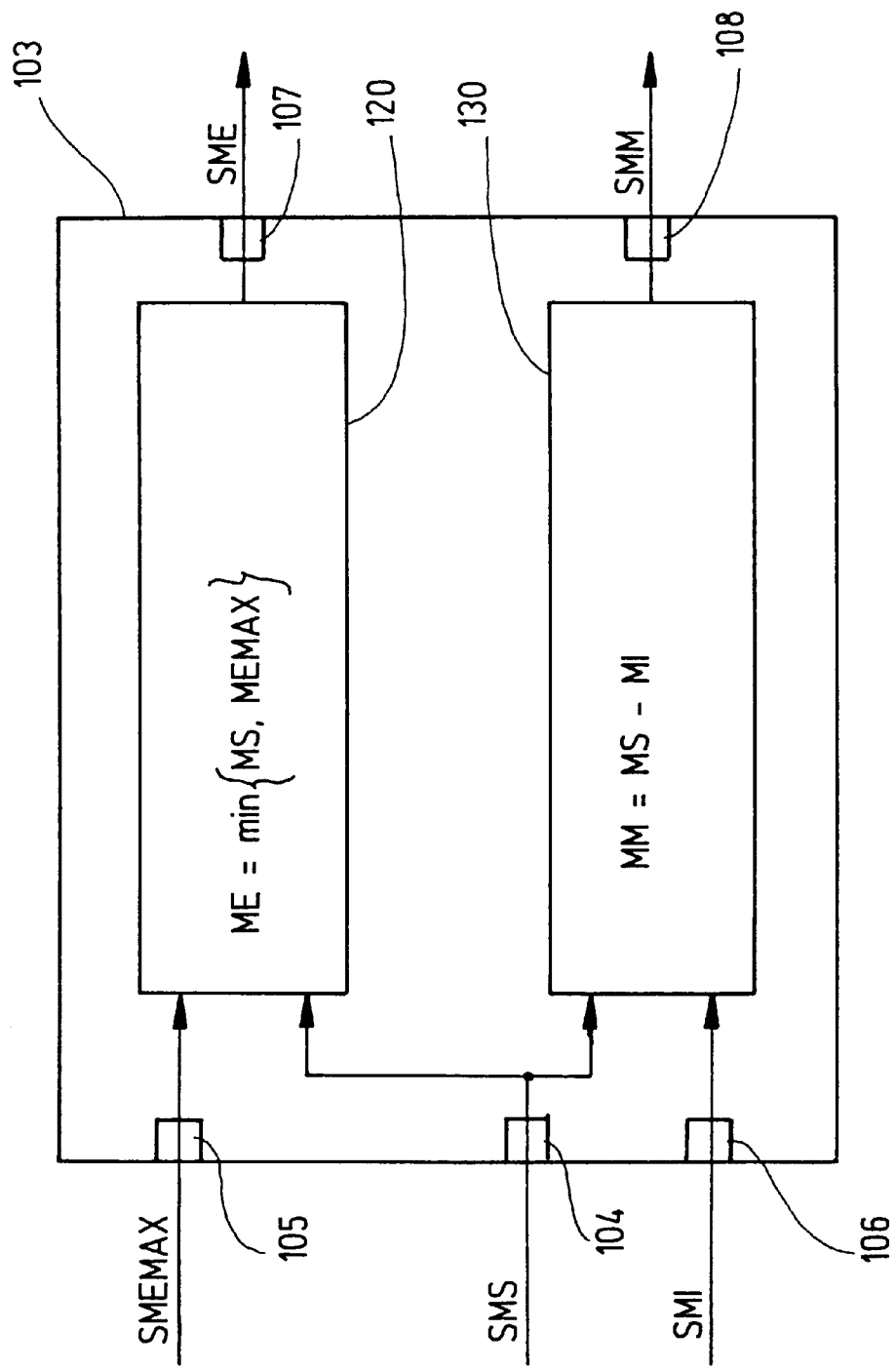
FIG. 2 illustrates a first example embodiment of a circuit according to the present invention, which may be used in conjunction with the braking torque regulator illustrated in FIG. 1.
Figure 3:
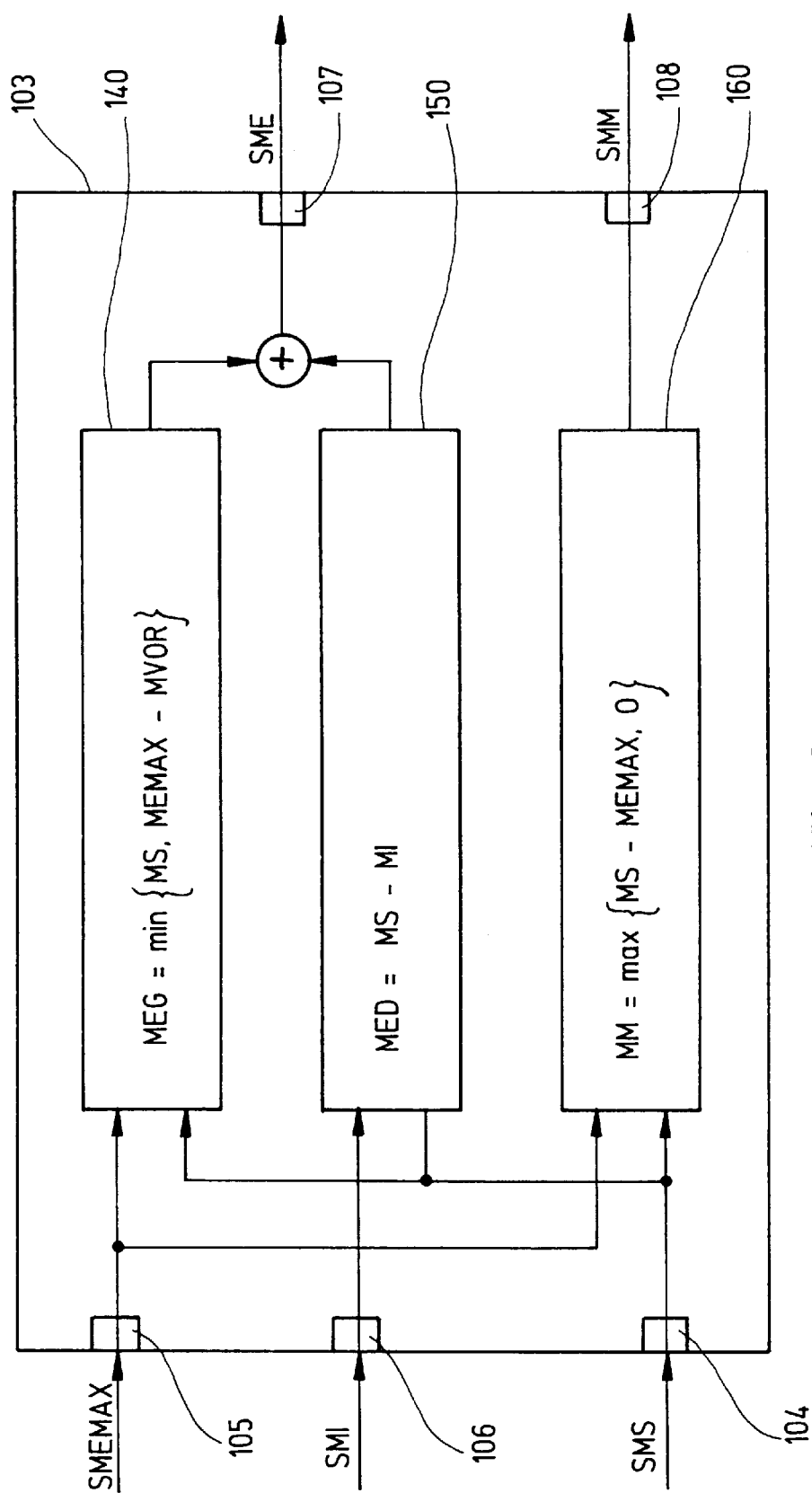
FIG. 3 illustrates a second example embodiment of the circuit according to the present invention, which may also be used in conjunction with the braking torque regulator illustrated in FIG. 1.

The description of FIGS. 2 and 3 yields two regulator variants which may be used in conjunction with the braking torque regulator illustrated in FIG. 1.

FIG. 2 is a schematic block diagram of a first example embodiment of the circuit according to the present invention. Circuit 103 has signal inputs 104, 105, 106 described above as well as signal outputs 107 and 108, which are also described above. The circuit illustrated in FIG. 2 generates first output signal SME via a circuit block 120 so that the following relationship applies to first braking torque ME:

$$ME = \min\{MS, MEMAX\}.$$

Second output signal SMM is determined by a circuit block 130 so that the following relationship applies to second braking torque MM:

$$MM = MS - MI.$$

According to the circuit illustrated in FIG. 2, therefore, braking torque MM to be generated by mechanical brake system 110 is regulated. In simplified terms, an attempt is initially made to generate setpoint braking torque MS exclusively by the braking energy recovery arrangement. Actual braking torque MI is subsequently detected by the sensor system and checked to see whether this actual braking torque MI corresponds to setpoint braking torque MS. If actual braking torque MI is too low, the missing braking torque is supplied by second braking torque MM, which is generated by mechanical, i.e., hydraulic, brake system 110.

FIG. 3 illustrates a second example embodiment of the circuit according to the present invention. Circuit 103 also has signal inputs 104, 105, 106 and signal outputs 107, 108 described above. According to the circuit illustrated in FIG. 3, first output signal SME is composed of two signals that are generated by a computation block 140 and a further computation block 150. First output signal SME is determined so that the following relationship applies to a first braking torque that is composed of a first braking torque component MEG and a second braking torque component MED:

$ME = MEG + MED$, where $MEG = \min\{MS, MEMAX - MVOR\}$ and $MED = MS - MI$.

Via a computation block 160, second output signal SMM is determined so that the following relationship applies to second braking torque MM:

$MM = \max\{MS - MEMAX, 0\}$.

The circuit illustrated in FIG. 3 therefore regulates a component of first braking torque ME.

The circuits illustrated in FIGS. 2 and 3 may be implemented through suitable circuit-engineering techniques and circuit components that may include for example, logic circuits, microprocessors, memories, etc.

The preceding description of the example embodiments according to the present invention serves only the purpose of illustration and is not meant to limit the present invention. According to the present invention, various changes and modifications are possible without abandoning the scope of the present invention or its equivalents.

What is claimed is:

1. A braking torque regulator for a vehicle, comprising:
    a braking energy recovery arrangement configured to generate a first braking torque that does not exceed a maximum first braking torque; and
    a mechanical brake system configured to generate a second braking torque;
    wherein the braking torque regulator is supplied with a setpoint braking torque, and the braking torque regulator is configured to regulate at least one of the first braking torque and the second braking torque so that the setpoint braking torque is used to correct an actual braking torque detected by a sensor system.

2. The braking torque regulator according to claim 1, wherein the sensor system includes wheel force sensors.

3. The braking torque regulator according to claim 1, wherein the sensor system is configured to detect the actual braking torque transferred from wheels to a road.

4. The braking torque regulator according to claim 1, wherein the setpoint braking torque is dependent on at least one of a position of a brake actuating element and a force applied to the brake actuating element.

5. The braking torque regulator according to claim 1, wherein only the second braking torque is regulated.

6. The braking torque regulator according to claim 5, wherein the following relationships are satisfied:

$ME = \min\{MS, MEMAX\}$; and $MM = MS - MI$;

wherein ME represents the first braking torque, MS represents the setpoint braking torque, MEMAX represents an instantaneous maximum first braking torque, MM represents the second braking torque, and MI represents the actual braking torque.

7. The braking torque regulator according to claim 1, wherein the braking torque regulator is configured to regulate only the first braking torque.

8. The braking torque regulator according to claim 1, wherein the first braking torque includes a first braking torque component and a second braking torque component, a selectable reserve torque provided to set a range of regulation, and wherein the following relationships are satisfied:

$MVOR \leq MEMAX$;

$ME = MEG + MED$;

$MEG = \min\{MS, MEMAX - MVOR\}$;

$MED = MS - MI$;

$MM = \max\{MS - MEMAX, 0\}$;

wherein MVOR represents the reserve torque, MEMAX represents an instantaneous maximum first braking torque, ME represents the first braking torque, MEG represents the first braking torque component, MED represents the second braking torque component, MS represents the setpoint braking torque, and MI represents the actual braking torque.

9. The braking torque regulator according to claim 1, wherein the braking energy recovery arrangement includes an electric machine configured to be operated in generator mode.

10. The braking torque regulator according to claim 9, wherein the electric machine is configured to be operated as a motor.

11. The braking torque regulator according to claim 1, further comprising a higher-level regulating device configured to influence the setpoint braking torque.

12. A method for regulating a braking torque of a vehicle, the vehicle including a braking energy recovery arrangement configured to generate a first braking torque that does not exceed a maximum first braking torque and a mechanical brake system configured to generate a second braking torque, comprising the steps of:
    detecting of a setpoint braking torque;
    providing a sensor system and detecting an actual braking torque by the sensor system; and
    regulating at least one of the first braking torque and the second braking torque so that the setpoint braking torque is used to correct the actual braking torque.

13. The method according to claim 12, wherein the providing and detecting step includes the substep of detecting wheel forces.

14. The method according to claim 12, wherein the providing and detecting step includes the substep of detecting torque transmitted from wheels to a road as the actual braking torque.

15. The method according to claim 12, wherein the detecting step includes the substep of detecting at least one of a position of a brake actuating element and a force applied to the brake actuating element.

16. The method according to claim 12, wherein only the second braking torque is regulated in the regulating step.

17. The method according to claim 12, wherein the regulating step includes the substeps of:

determining the first braking torque according to the following relationship:

$ME = \min\{MS, MEMAX\}$; and determining the second braking torque according to the following relationship:

$MM = MS - MI$;

wherein ME represents the first braking torque, MS represents the setpoint braking torque, MEMAX represents the maximum first braking torque, MM represents the second braking torque, and MI represents the actual braking torque.

18. The method according to claim 12, wherein only the first braking torque is regulated in the regulating step.

19. The method according to claim 18, wherein the regulating step includes the substeps of:

defining a reserve torque for setting a range of regulation so that the following relationship is satisfied:

$MVOR \leq MEMAX$;

determining a first braking torque component of the first braking torque according to the following relationship:

$MEG = \min\{MS, MEMAX - MVOR\}$;

determining a second braking torque component of the first braking torque according to the following relationship:

$MED = MS - MI$; and determining the second braking torque according to the following relationship:

$MM = \max\{MS - MEMAX, 0\}$;

wherein MVOR represents the reserve torque, MEMAX represents the maximum first braking torque, MEG represents the first braking torque component, MS represents the setpoint braking torque, MED represents the second braking torque component, MI represents the actual braking torque, and MM represents the second braking torque.

20. The method according to claim 12, wherein the braking energy recovery arrangement includes an electric machine configured to be operated in generator mode.

21. The method according to claim 20, wherein the electric machine is configured to be operated as a motor.

22. The method according to claim 12, wherein the detecting step includes the substep of influencing the setpoint braking torque by a higher-level regulating device in certain vehicle operating states.

23. A circuit for a braking torque regulator for a vehicle, comprising:

a first signal input configured to supply a first input signal corresponding to a setpoint braking torque;

a second signal input configured to supply a second input signal corresponding to a maximum braking torque generatable by a braking energy recovery arrangement of the vehicle;

a third signal input configured to supply a third input signal corresponding to a detected actual braking torque;

a first signal output configured to output a first output signal that defines a first braking torque to be generated by the braking energy recovery arrangement; and a second signal output configured to output a second output signal that defines a second braking torque to be generated by a mechanical brake system;

wherein the circuit is configured to determine the first output signal so that the following relationship applies to the first braking torque:

$ME = \min(MS, MEMAX)$; and wherein the circuit is configured to determine the second output signal so that the following relationship applies to the second braking torque:

$MM = MS - MI$;

wherein ME represents the first braking torque, MS represents the setpoint braking torque, MEMAX represents the maximum first braking torque, MM represents the second braking torque, and MI represents the actual braking torque.

24. A circuit for a braking torque regulator for a vehicle, comprising:

a first signal input configured to supply a first input signal corresponding to a setpoint braking torque;

a second signal input configured to supply a second input signal corresponding to a maximum braking torque generatable by a braking energy recovery arrangement of the vehicle;

a third signal input configured to supply a third input signal corresponding to a detected actual braking torque;

a first signal output configured to output a first output signal that defines a first braking torque to be generated by the braking energy recovery arrangement; and a second signal output configured to output a second output signal that defines a second braking torque to be generated by a mechanical brake system;

wherein a selectable reserve torque is provided to set a range of regulation, and wherein the following relationship applies to the reserve torque:

$MVOR \leq MEMAX$;

wherein the circuit is configured to determine the first output signal so that the following relationship applies to a first braking torque, which includes a first braking torque component and a second braking torque component:

$ME = MEG + MED$, where $MEG = \min\{MS, MEMAX - MVOR\}$ and $MED = MS - MI$; and wherein the circuit is configured to determine the second output signal so that the following relationship applies to the second braking torque:

$MM = \max\{MS - MEMAX, 0\}$;

wherein MVOR represents the reserve torque, MEMAX represents the maximum first braking torque, ME represents the first braking torque, MEG represents the first braking torque component, MED represents the second braking torque component, MS represents the setpoint braking component, MI represents the actual braking torque, and MM represents the second braking torque.

* * * * *